United States Patent [19]
Binder

[11] Patent Number: 6,002,248
[45] Date of Patent: Dec. 14, 1999

[54] ANTIFRICTION BEARING INCLUDING MICROSENSOR FOR DETERMINING PARAMETERS, IN PARTICULAR WHEEL BEARING FOR MOTOR VEHICLES

[75] Inventor: Josef Binder, Bremen, Germany

[73] Assignee: FAG Automobiltechnik AG, Germany

[21] Appl. No.: 08/831,467

[22] Filed: Mar. 31, 1997

[30] Foreign Application Priority Data

Mar. 30, 1996 [DE] Germany ............... 196 12 825

[51] Int. Cl.$^6$ ............... G01L 5/16; G01P 3/484
[52] U.S. Cl. ............... 324/160; 384/448
[58] Field of Search ............... 324/160, 162; 384/448; 340/670, 671; 180/174, 282; 73/488, 514.01; 200/61.45 R; 280/734, 735

[56] References Cited

U.S. PATENT DOCUMENTS 4,991,682  2/1991  Kuntz et al. ............... 200/61.45 R
5,821,419  10/1998 Mader et al. .

FOREIGN PATENT DOCUMENTS

432122    6/1991   European Pat. Off. .
3735070   4/1989   Germany .
4411130   10/1995  Germany .
95 27216  10/1995  WIPO .

*Primary Examiner*—Walter E. Snow
*Attorney, Agent, or Firm*—Ostrolenk, Faber, Gerb & Soffen, LLP

[57] ABSTRACT

In order to achieve direct digital data recording and reliable and space saving and cost saving recording of the status of an antifriction bearing, in particular a wheel bearing for motor vehicles, sensors record the rotational speed and acceleration of the wheels and driving and/or braking forces. The sensors are microsensors in the form of microswitch arrays, at least one of which is attached to the rotating ring of the bearing, and the generated signals are compared with stored basic patterns or with the signals of an identical or similar microsensor arranged on the stationary ring of the bearing and/or are evaluated.

22 Claims, 9 Drawing Sheets

ARRANGEMENT

Fig. 7

CHIP DESIGN

Fig. 8

PATTERN OF THE DIGITAL SIGNAL

MEASUREMENT VARIABLES

- ROTATIONAL SPEED OF WHEELS (VIA $F_r$)

- LATERAL FORCE (LATERAL ACCELERATION) $a_L$

- ANGULAR ACCELERATION $\quad \dfrac{dw}{dt} \cdot r$

- GRAVITY

- RELATIVE MEASUREMENT VARIABLE $\quad \dfrac{dw}{dt} \cdot r \Big/ 1g$

Fig. 10

ARRANGEMENT

Fig. 11

MICROCHIP DESIGN

Fig. 12

PATTERN OF THE DIGITAL SIGNAL

Fig. 13

MEASUREMENT VARIABLES

- ROTATIONAL SPEED OF WHEELS (VIA $F_r$)

- LATERAL FORCE (LATERAL ACCELERATION) $a_L$

- ANGULAR ACCELERATION $\dfrac{dw}{dt} \cdot r$

- GRAVITY

- RELATIVE MEASUREMENT VARIABLE $\dfrac{\dfrac{dw}{dt} \cdot r}{1g}$

ANTIFRICTION BEARING INCLUDING MICROSENSOR FOR DETERMINING PARAMETERS, IN PARTICULAR WHEEL BEARING FOR MOTOR VEHICLES

BACKGROUND OF THE INVENTION

The invention relates to an antifriction bearing with a sensor for speed or acceleration of the wheels or for driving or braking forces, wherein the sensor includes a microsensor.

Many antifriction bearings with sensors are known. For instance, DE 37 35 070 A1 shows an antifriction bearing with a pulse ring to record its rotational speed. EP 0 432 122 A3 shows a wheel bearing for motor vehicles with a load sensing device. DE 42 39 828 A1 discloses a hub and bearing arrangement with an integrated rotational sensor and temperature measurement.

For actively stabilizing a vehicle like a car, a large number of parameters should be recorded, which describe the momentary status of the vehicle and are used as input parameters for control systems. Measuring directly measurable variables is advantageous. These variables include braking and driving forces, i.e., lateral forces, the rotational speed of the wheels, the angular acceleration and lateral forces acting on the chassis. Owing to the transmission of force from the road to the chassis of the vehicle, the wheel bearing provides an ideal measuring point for recording forces and accelerations. Measuring the angular acceleration on the rotating part and measuring the lateral acceleration given by driving or braking operations permits indirect determination of slip, one of the main measurement variables in the antilock brake system, antislip control and dynamic vehicle stabilizing.

A sensor system provided for measuring these variables can be integrated in the wheel bearings both of the driven wheels and of the non-driven wheels and can be installed in the car as an intelligent subsystem.

Within antilock brake systems or antislip control systems, passive or active sensors are currently being used as sensory components to measure the rotational speed of the wheels. Furthermore, future integrated cost effective sensors are provided for recording the yaw moment (see Elektronik Journal 13/1995 pages 34 and 36), the yaw moment occurring during a skidding operation being compared with the steering-wheel angle.

It has previously only been possible to record accumulated loads, for example, forces in the wheel bearing and the friction value between the tires and road surface, directly with the aid of expensive measuring systems which are used on prototypes.

For example, a multicomponent wheel hub records forces and moments by applying a relatively complex and expensive strain gage in conjunction with complex signal processing and transmission of measured values. A so-called measurement wheel system is known, which also uses strain gages to measure the forces occurring in the wheel bearing indirectly by means of load cells.

Other measuring systems permit the friction value between the tires and the road surface to be measured by very small permanent magnets vulcanized into the tire, and the change in the magnetic field caused by the braking or acceleration operation is detected by Hall sensors.

A high degree of complexity and thus high costs are common to all the systems, thus ruling out their application as a mass product.

SUMMARY OF THE INVENTION

The object of the invention is to provide an antifriction bearing which reliably records different parameters prevailing on the bearing and makes them accessible for evaluation, with the intention of implementing a space saving and cost effective design.

With the aid of the sensor system proposed, lateral force and acceleration, the angular acceleration and the rotational speed of the wheels can be recorded at the wheel bearing. The system comprises microcomponents which are produced cost effectively using methods of microsystem engineering and can thus be used as a mass produced product in any or all four wheel bearings of the vehicle.

The basic concept of the invention comprises installing microsensors in the form of microswitch arrays in the rotating ring or attached part of the wheel bearing and possibly optionally in the static ring or attached parts of the wheel bearing. Forces and accelerations and the rotational speed are measured by a microsensor which is attached to the movable ring of the wheel bearing (e.g. on the dust sleeve). This data is compared with electronically stored basic patterns or with an identical or similar microsensor which is attached to the fixed part of the wheel bearing. The data from the sensor are made available to a central vehicle control system that is responsible, for example for controlling the anti-lock or ABS braking system or the anti-skid system. The data is there compared with stored samples. The microsensors comprise an array, produced by microtechnology methods, of movable bending bar systems which can be moved laterally against two or more mechanical stops under the influence of force.

The energy supply and the signal transmission must inevitably take place in the rotating system by means of telemetry, e.g. by inductive coupling. In contrast, telemetry or cable transmission can be used selectively for the static system. The inductive coupling takes place by means of coils which, in some proposed applications, may consist of electroplated and microstructured planar coils.

If this sensor system is to be employed as a rotating system energy must be provided and data transmitted telemetrically. This requires a coil arrangement comprising one coil at the sensor end and another at the receiver end. The sensor-end coil communicates with the sensor by a telemetry unit (IC). If these parts are individual components, they will be connected by a cable. The cable can be eliminated by direct integration onto a chip.

By comparing the signals from microsensors installed in each case in four wheel bearings with the signals from the static microsensors, in principle the following relevant variables can be recorded for brake systems, antislip systems and chassis control systems:

rotational speed of the wheels
lateral forces (braking and driving forces)
lateral forces on the static part of the wheel bearing
tangential force, i.e. angular acceleration on the rotating system
indirect recording of the slip by comparing the lateral acceleration with the angular acceleration
lateral forces In principle, the rotating microsensor can be used to measure the rotational speed of the wheels, this being possible up to the vehicle velocity v=0. This obviates the need for using passive and active magnetic field sensors and for using corresponding passive and active encoders.

The microsensor comprises an array of micro-bending bars which are made on a silicon chip by means of electroplating methods and microstructuring techniques. The microswitch array and manufacturing method are described in German Patent Application P 44 11 130.4 to which U.S. Pat. No. 5,821,419 claims priority.

The novel features, however, are the use of this microchip within a rotating system in the wheel bearing and different design variants which make the measurement of the above mentioned variables possible in the first place.

The laterally oscillating arrays of micro-bending bars have different properties. For instance, different operating points can be influenced and defined, on the one hand, by the distance between the stops of bending bars and, on the other hand, by the dimensions of the bending bars.

Further parameters which describe the microswitch array are the switching time, the sensitivity, the resonance frequency, the duration of switch closure and the damping.

Up to 50 bending bars can be integrated on one 4×4 mm$^2$ silicon chip. In a dynamic operation (under the influence of forces and moments), a specific number of bending bars will close an electrical contact and the remainder stay open. If the forces are weak, only a few micro-bending bars will deliver their sensor signals by contacting one of their stops, but for strong forces correspondingly more micro-bending bars will deliver their signals. A digital word is thus produced, which describes the momentary dynamic status of the system. During a braking or acceleration operation, the different phases constantly generate different patterns of sensor signals (or different digital words).

In this case, it is possible for there to be a any of a plurality of variants of a microsensor in the rotating part of the wheel bearing. One variant has a symmetrical structure, the sizes and operating point of all the micro-bending bars having the same dimensions. This system can be applied in the center of the wheel hub, with the intention that the signal transmission take place inductively, by means of a microcoil mounted opposite the microchip. The bending bars may be arranged in the manner of a rosette. Four forces act on the bending bars, namely the lateral force, the tangential force caused by the angular acceleration, the radially directed centrifugal force and gravity. In the case of "no-force travel" (braking and driving forces equal to zero), gravity acts depending on the current position of the microchip, which leads to a sinusoidal deflection when considering one bar.

In an arrangement of a plurality (up to, for instance, 50) of bending bars, a digital word results in the case of rotating no-force movement, the word being given by the deflection of the bending bars caused by gravity.

The "switching pattern" and thus the digital word are then modified by the influence of the forces occurring during a braking or acceleration operation. As a result of the angular acceleration, the tangential force brings about a positive superimposition of gravity and the tangential force for half of the bending bars and a negative superimposition for the other half. In the corresponding switching pattern, this means an effective elevation of the sine signal relative to the operating point.

The lateral force then has to be added vectorially, which leads to a "phase shift" of the switching pattern. The lateral force (lateral acceleration), the tangential force (angular acceleration) and the rotational speed (via the frequency of the pattern) can basically be determined with the aid of this chip.

The following system specific advantages are thus obtained:

1. Measuring the rotational speed, which is possible up to v=0, makes conventional systems based on passive or active magnetic field sensors and corresponding encoders obsolete. This thus results in a cost-saving potential.

2. Recording the lateral acceleration and angular acceleration can be carried out on all four bearings, so that "indirect measurement" of the slip is thus possible without a further microsensor being required in the static part of the wheel bearing.

A problem with concentric installation of the microchip lies in the low angular acceleration, compared with the lateral acceleration and gravity occurring. This necessitates a high degree of accuracy and a high degree of overload strength of the microswitch array. This problem can be eliminated by installing the chip on a ring (e.g. in the dust sleeve) of the wheel bearing. Owing to the large distance from the center point of rotation, the angular acceleration is higher by at least one order of magnitude than in the case of concentric installation.

A possible design variant of the microchip in the said application results when a chip is comprised of two arrays, which are respectively arranged parallel and perpendicular to the centrifugal force acting radially. With the array arranged in parallel, during rotation, only the lateral acceleration and the angular acceleration lead during rotation to a deflection of the bending bars, while the centrifugal force has no influence. The array arranged perpendicularly records the rotational speed of the wheels via the centrifugal force.

The lateral force (lateral acceleration), the tangential force (angular acceleration) and gravity act on the sensitive "parallel array" arrangement. Thus, in the no-force state, the basic pattern of a digital word again results. The lateral acceleration and angular acceleration lead to a change in the word pattern. Differing from a first installation variant (at the center of the wheel hub), however, the angular acceleration is far greater due to the radius of the ring (installation site of the microsensor), so that the measuring accuracy is sufficient in recording the angular acceleration as compared with the lateral force and gravity.

To increase the accuracy and from the aspect of data transmission which is as simple and cost-effective as possible at the center-point of the wheel hub, an analog system in the form of a differential capacitor arrangement is proposed.

This variant shows a "spiral" rotational capacitor which is produced by galvanic/additive techniques and can be excited to perform torsional movements in a similar way to a clock mechanism. In principle, this structure constitutes a torque sensor which—applied to the center-point of the wheel hub—can record angular accelerations. In this case, the signal pickup takes place by means of a differential capacitor arrangement. Recording the torque in this variant is largely independent of the lateral acceleration and gravity and, additionally, relatively simple compensation of disturbing effects due to vibration is possible.

Basic advantages of the microsensor system lie, on the one hand, in system specific advantages and in technology related and cost specific advantages. The former area includes the simple applicability of the microsensors (in comparison with conventional strain gage structures), the direct digital data recording (mechanical A/D converter), the low power consumption due to the sensor principle, and the high electromagnetic compatibility. The technology-related and cost-specific advantages include the simple integration of the microswitch array with an evaluation IC, the telemetry chip and the microcoil by means of plating/additive techniques.

The invention is explained in detail below by way of an exemplary embodiment. Other features and advantages of the present invention will become apparent from the following description of the invention which refers to the accompanying drawings.

DETAILED DESCRIPTION OF PREFERRED EMBODIMENTS OF THE INVENTION

Figure 1:
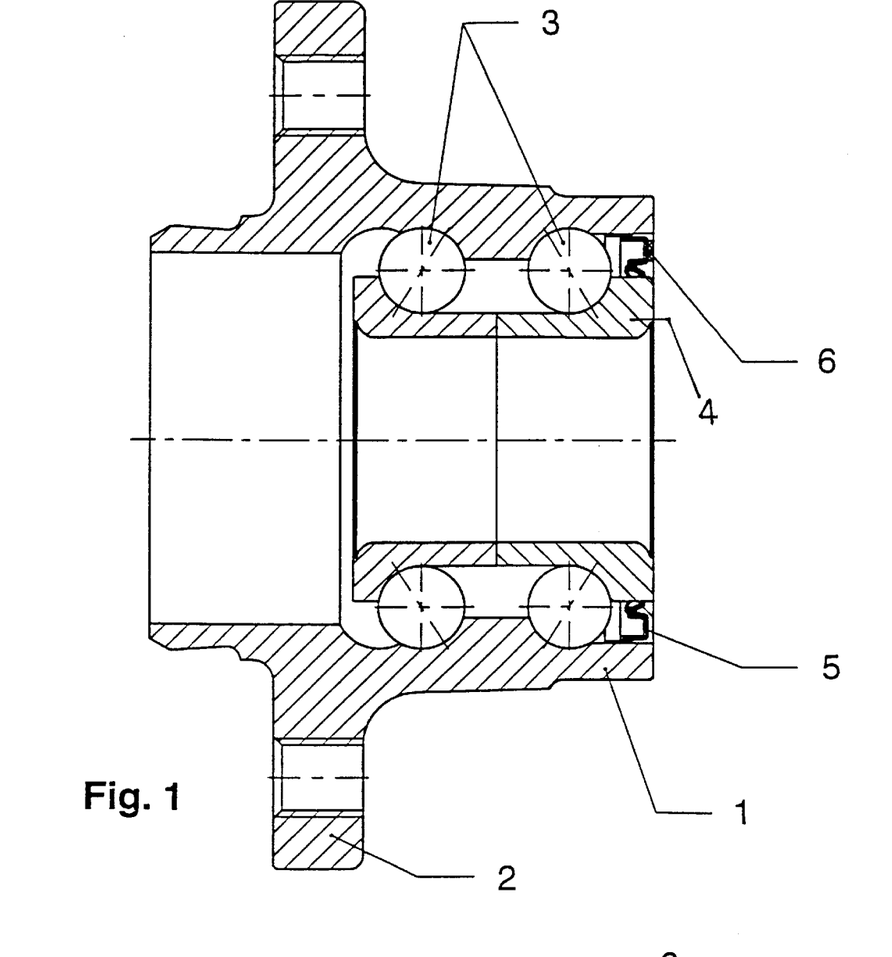
FIG. 1 shows a cross section through an antifriction bearing which is provided with a microsensor arranged on the seal.
Figure 2:
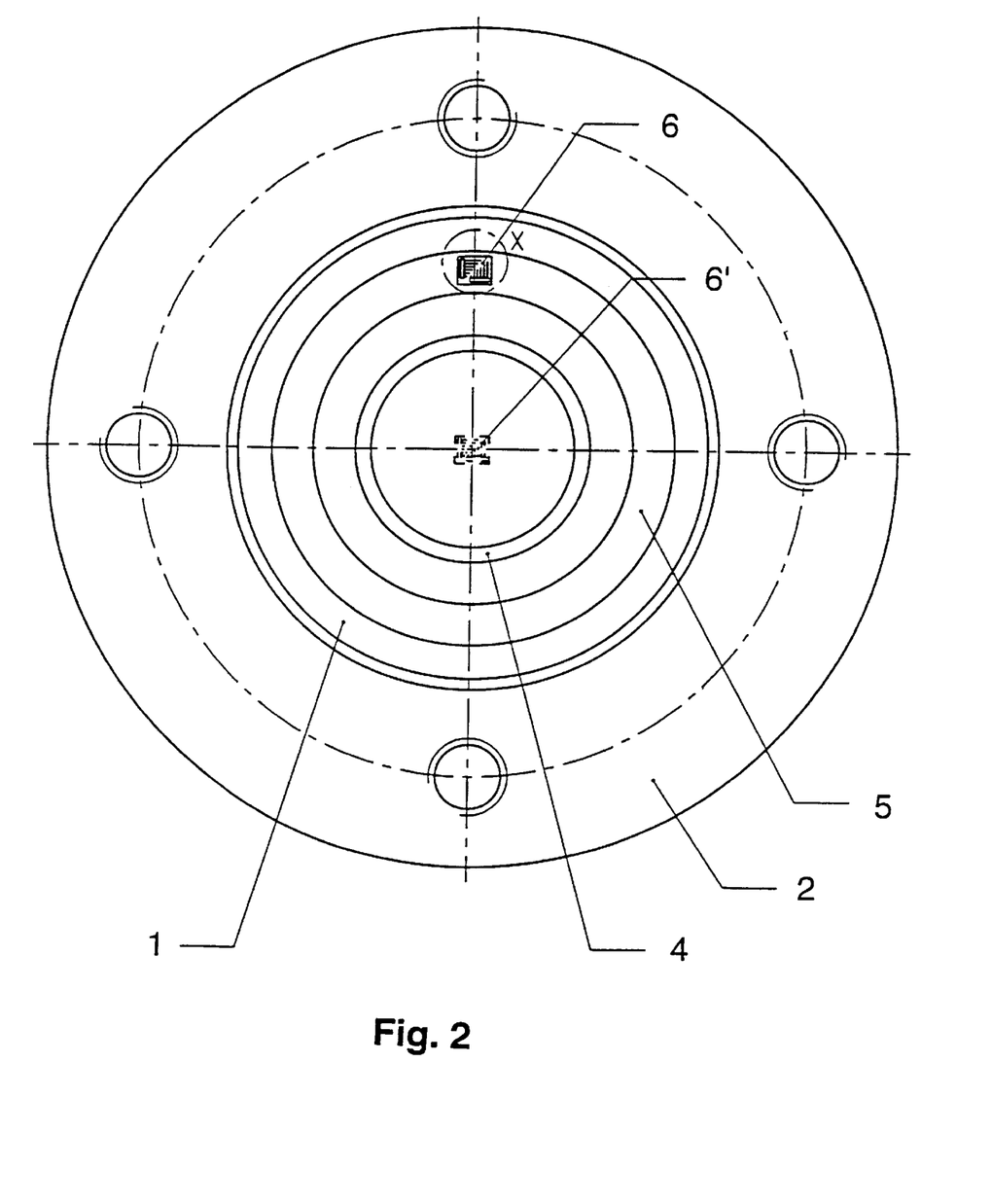
FIG. 2 shows the front view of the antifriction bearing of FIG. 1.

FIG. 1 shows an antifriction bearing wherein the wheel flange 2 is integrated in the outer ring 1. The outer ring 1 of the antifriction bearing has two raceways for two annular rows of bearing balls 3 which are arranged between the outer ring and the inner ring 4 of the antifriction bearing. In this design, the inner ring of the antifriction bearing is in two axially separate, adjacent parts. A seal 5 attached to the rotating outer ring is disposed in the radial space between the outer ring 1 and the inner ring 4. The seal carries a microsensor 6. FIG. 2 shows the arrangement of the seal 5 and the microsensor 6 on the wheel bearing. In this case, the microsensor 6 may be attached to the seal 5 by bonding or it is vulcanized into the sealing material or arranged on the rotating bearing ring in another manner.

Figure 3:
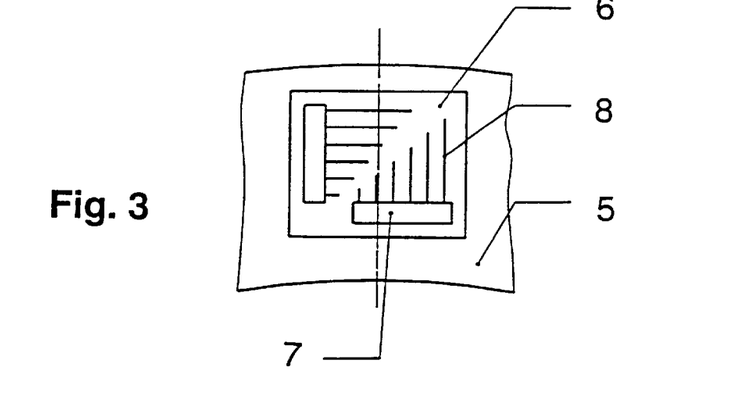
FIG. 3 shows the detail X from FIG. 2, namely the microsensor.

FIG. 3 shows that the microsensor 6 comprises two arrays 7 which are offset by 90° relative to one another. Each array has six micro-bending bars 8. Up to 50 micro-bending bars 8 can be arranged on one chip since microtechnology nowadays permits the production of very fine structures.

Figure 4:
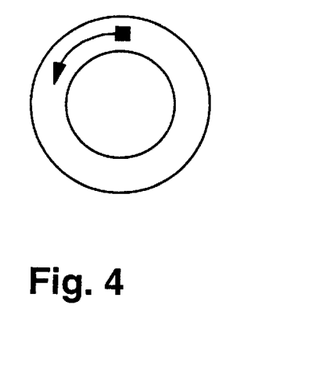
FIG. 4 illustrates the sensor system on a co-rotating part of the wheel bearing, e.g., a seal.
Figure 4A:
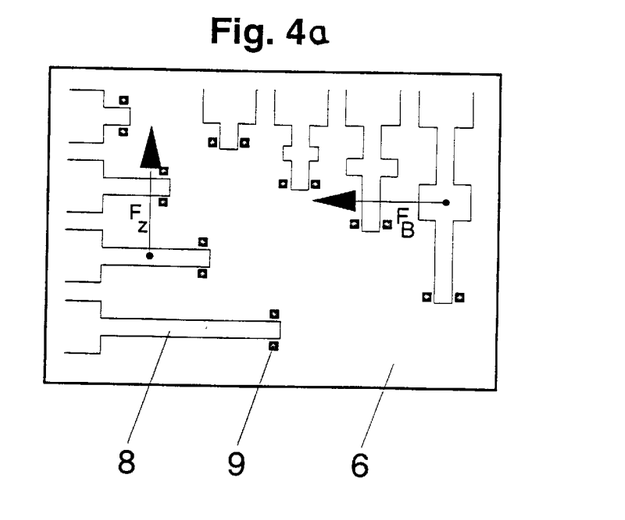
FIG. 4a is a detailed view of a part of the sensor and diagrammatically shows the forces and accelerations acting on the bending bars when the microsensor is arranged on the seal of the antifriction bearing.

In FIG. 4a, the bending bars 8 have different lengths, so that they respond differently to the forces acting on them and thus generate specific switching patterns when they rest under the influence of force against the switching stops 9 and close an electronic contact, that is to say give off a typical signal. This switching pattern can be compared with an electronically stored basic pattern, as has been described above herein, or can be set in relation to a second switching pattern which is generated by one or more microsensors 6' arranged on the stationary bearing part.

Figure 4B:
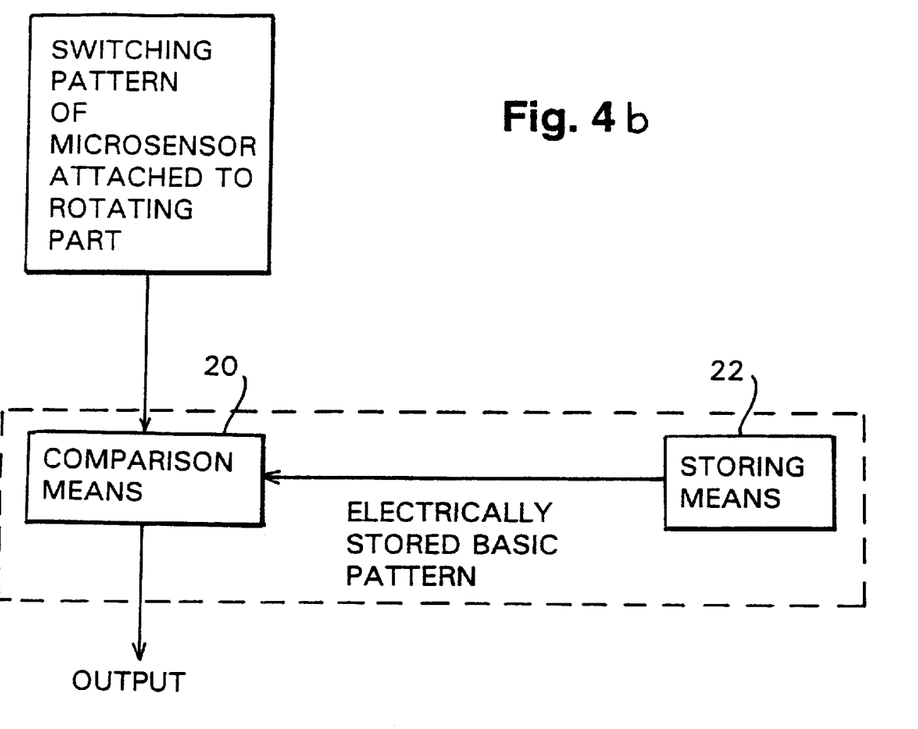
FIG. 4b is a representative block diagram of partial processing of the switching pattern for one embodiment of the invention.
Figure 4C:
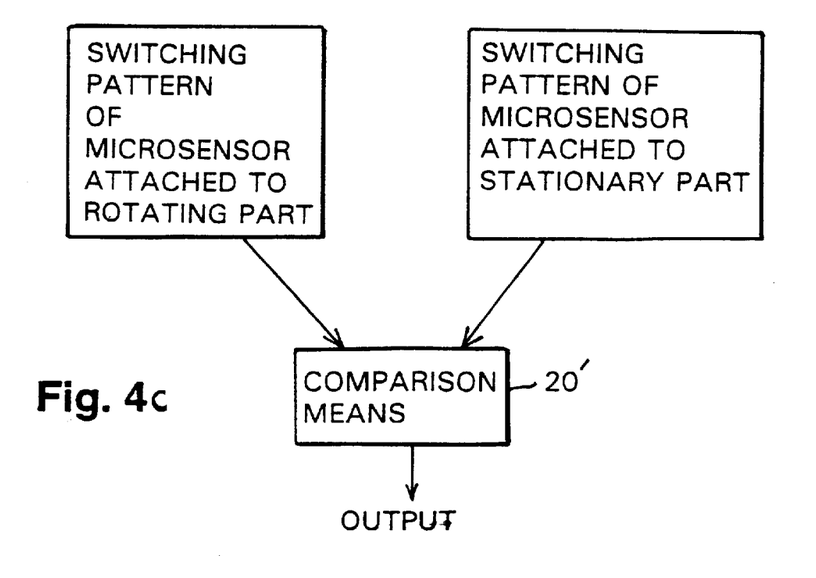
FIG. 4c is a representative block diagram of partial processing of the switching pattern for another embodiment of the invention.

More general representations of such processing alternatives are shown in FIGS. 4b and 4c. In particular, FIG. 4b shows the switching pattern of the microsensor attached to a rotating part being supplied to a comparison means 20. A storing means 22 supplies an electronically stored basic pattern to the comparison means. Output of the comparison means 20 gives an indicia of at least one of the factors comprising the speed, acceleration, driving forces and braking forces. FIG. 4c shows the switching pattern of the microsensor attached to a rotating part being supplied to a comparison means 20'. A switching pattern generated by a microsensor on a stationary bearing part is also supplied to comparison means 20'. Output of the comparison means 20' gives an indicia of at least one of the factors comprising the speed, acceleration, driving forces and braking forces.

Figure 5:
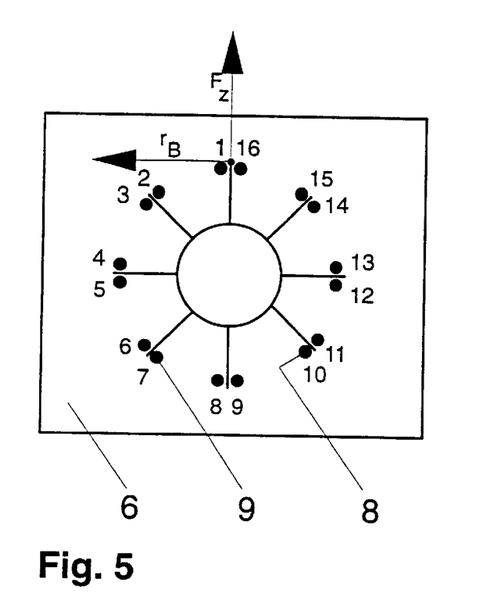
FIG. 5 diagrammatically shows the forces and accelerations acting on the bending bars when the microsensor is arranged concentrically relative to the axis of the antifriction bearing.

FIG. 5 shows the micro-bending bars 8 arranged in a radial manner, and the switching stops 9 are numbered consecutively from 1–16.

Figure 6:
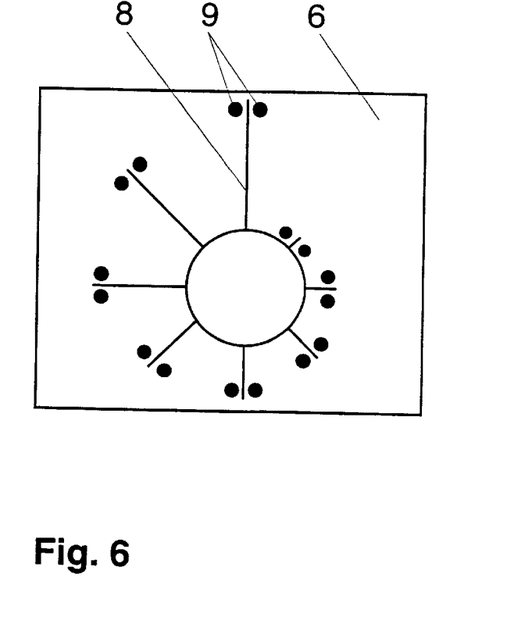
FIG. 6 diagrammatically shows a microsensor with bending bars of different lengths.

FIG. 6 shows a spiral arrangement of the bending bars 8 and the switching stops 9 combining different length bars as in FIG. 4 and a radial array as in FIG. 5.

Figure 7:
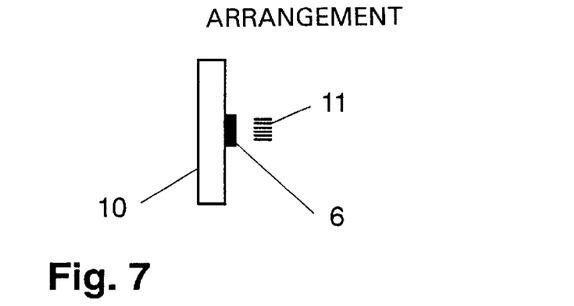
FIG. 7 diagrammatically shows the arrangement of the microchip and microcoil in the center-point of the hub.

In FIG. 7 shows a microsensor 6 arranged concentrically on a wheel hub 10 which rotates. The energy supply and the signal transmission take place by inductive coupling from the microsensor 6 to the coil 11 which, for example, is an electroplated and microstructured planar coil or coils. The coil 11 may be connected to the vehicle steering means.

Figure 7A:
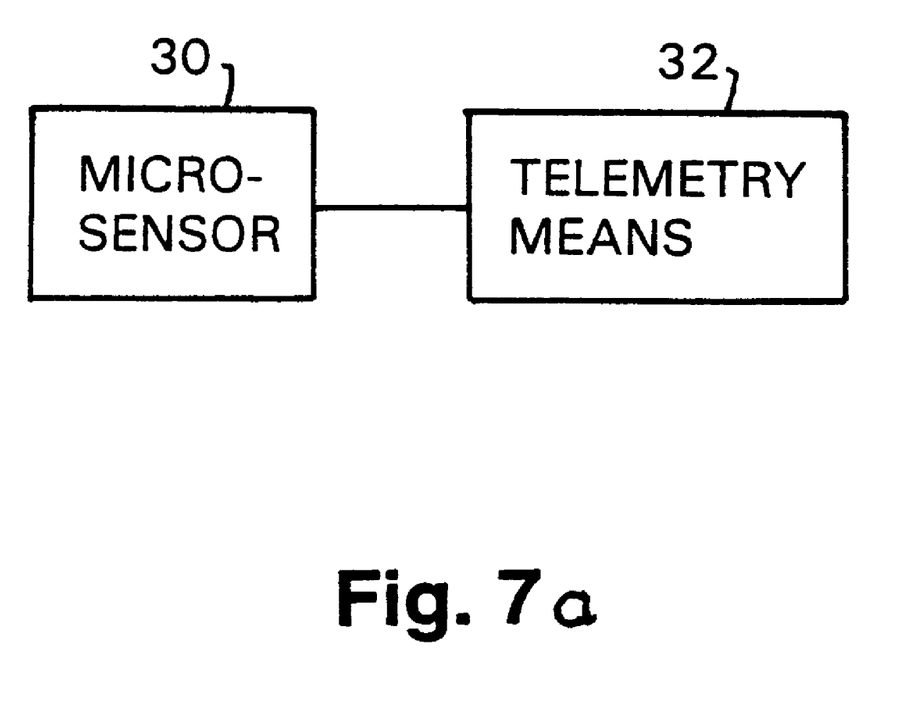
FIG. 7a is a representative block diagram of a microsensor coupled with telemetry means.

More generally, FIG. 7a represents a microsensor 30 coupled with telemetry means 32. The line joining the microsensor 30 and the telemetry means 32 represents both power transmission to the microsensor 30 via telemetry means 32 and signal transmission from the microsensor 30 via the telemetry means 32.

Figure 8:
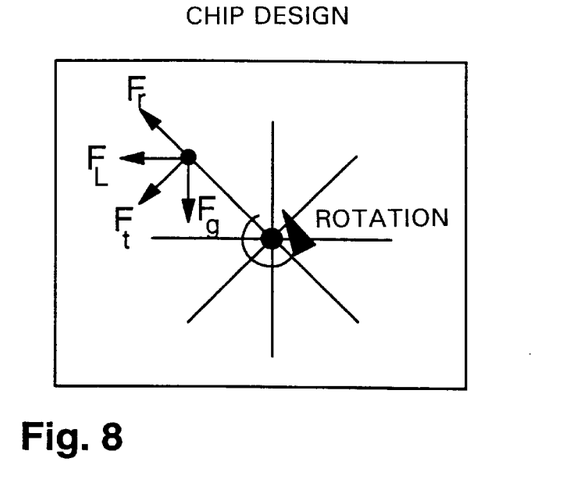
FIG. 8 shows the chip design with the forces acting on the bending bars.

FIG. 8 illustrates the forces acting on a micro-bending bar 8. In this case, $F_r$ is the radial force, $F_L$ is the lateral force, $F_t$ is the tangential force and $F_g$ is the force of gravity.

Figure 9:
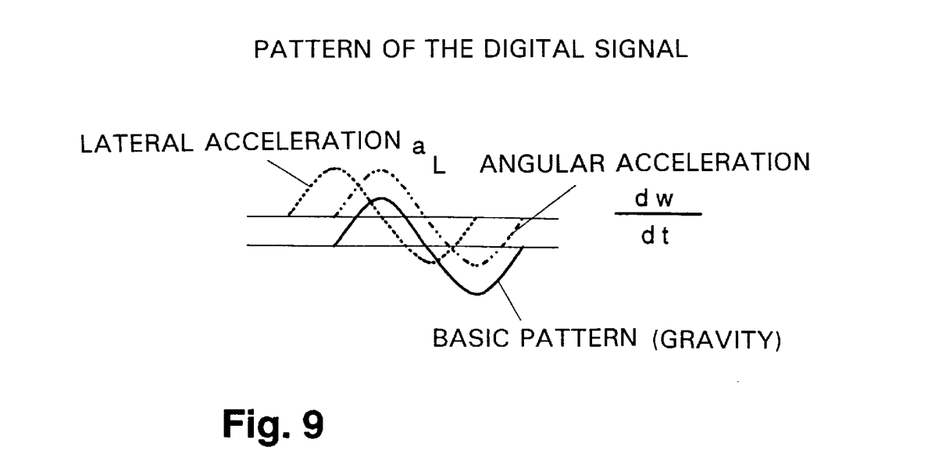
FIG. 9 shows the pattern of the digital signal.
Figure 10:
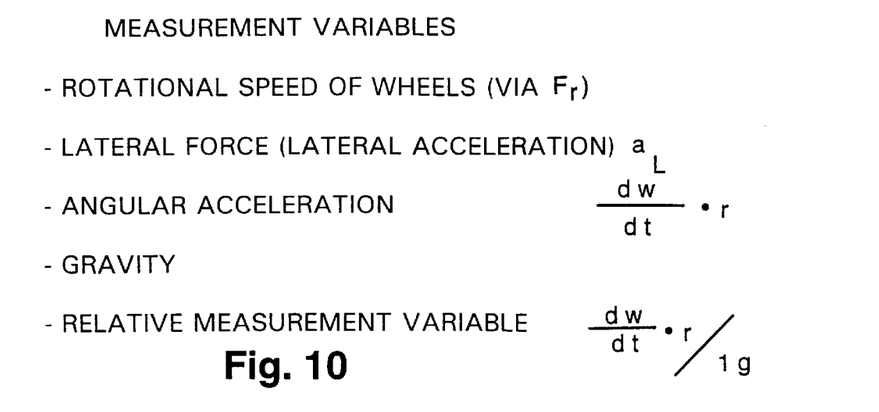
FIG. 10 shows a table of the measurement variables.

The pattern of a digital signal, that is to say a switching pattern, is shown in FIG. 9, and a table of the recorded and evaluated measurement variables is shown in FIG. 10. A digital word is thus obtained, which describes the momentary status of the system. During a braking or acceleration operation, the different phases constantly generate different patterns which are then evaluated accordingly.

Figure 11:
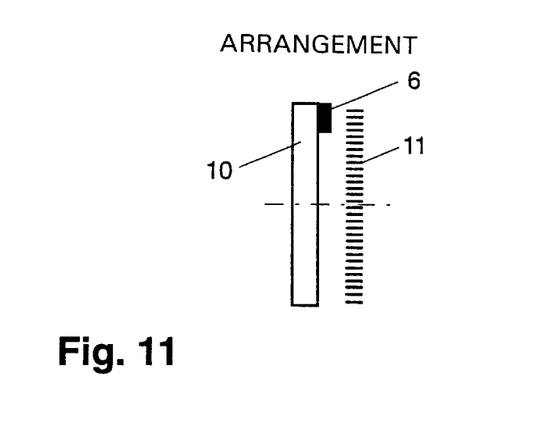
FIG. 11 diagrammatically shows the arrangement of the microchip on the seal of the antifriction bearing and the microcoil.

FIG. 11 shows a microsensor 6 arranged eccentrically on a wheel hub 10 or on the seal 5 which rotates. The energy supply and the signal transmission again take place by inductive coupling by means of coils 11 as described with reference to FIG. 7.

Figure 12:
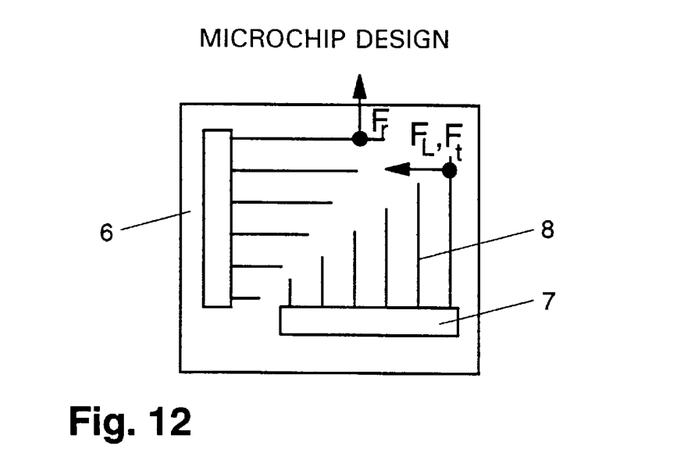
FIG. 12 shows the chip design with the forces acting on the bending bars in the arrangement shown in FIG. 11.

FIG. 12 illustrates the forces acting on a micro-bending beam 8. In this case, $F_r$ is the radial force, $F_L$ is the lateral force and $F_t$ is the tangential force.

Figure 13:
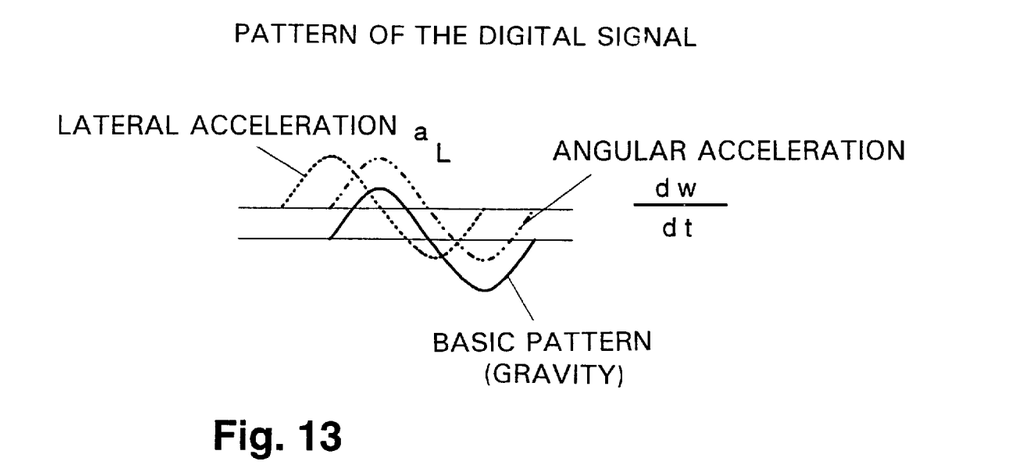
FIG. 13 shows the pattern of the digital signal.
Figure 14:
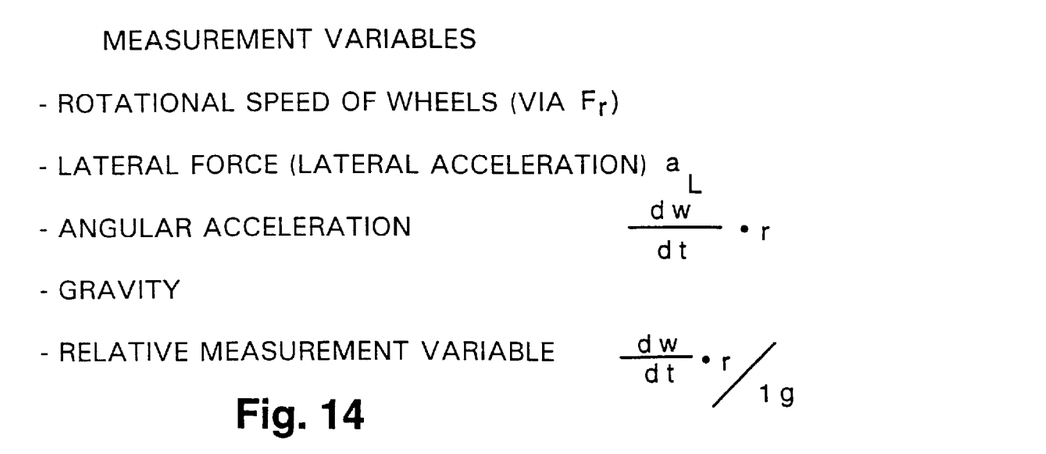
FIG. 14 shows a table of the measurement variables.

The pattern of a digital signal from FIG. 12 is shown in FIG. 13, and a table of the recorded and evaluated measurement variables is shown in FIG. 14.

Figure 15:
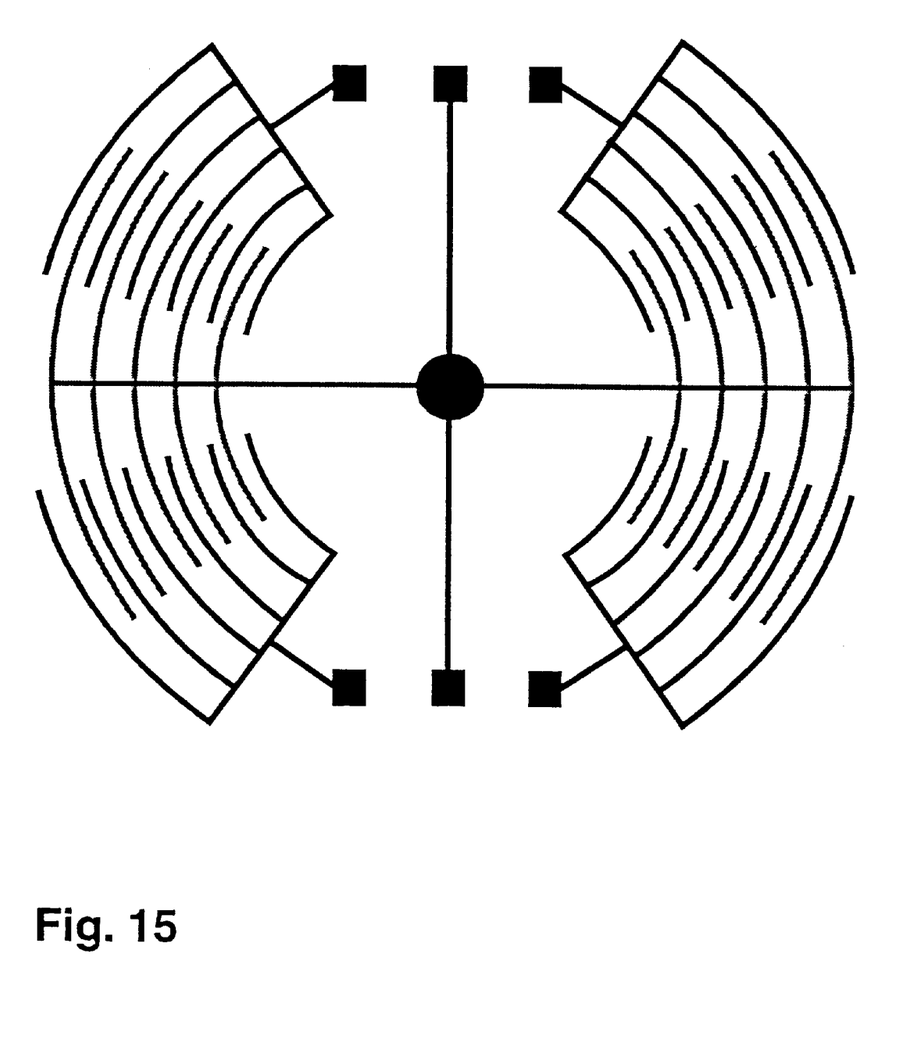
FIG. 15 diagrammatically shows the microsensor in the form of a rotational capacitor.

FIG. 15 represents diagrammatically the microsensor in the form of a rotational capacitor which can be excited to perform torsional movements in a similar way to a clock mechanism and is produced by plating/additive techniques. The axis of rotation is at the center of the sensor. The component inside the sensor is loosely suspended. Upon acceleration, the inside component rotates and its circumferential portions extend to varying extent into its stationary circumferential components. Rotational acceleration can be detected by capacitive measurement of the four capacitors while the system rotates. In principle, this structure constitutes a torque sensor which, when applied to the center point of the wheel hub, can record angular accelerations. In this case, the signal pickup takes place by means of a differential capacitor arrangement. Recording the torque in this variant is largely independent of the lateral acceleration and gravity and, additionally, relatively simple compensation of disturbing effects due to vibration is possible.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An antifriction bearing including an outer ring and an inner ring wherein the rings are relatively rotatable and bearing rolling elements between the inner and outer rings;
   a microsensor for recording rotational speed or acceleration and various driving and braking forces between the rings; the microsensor being in the form of a microswitch array attached to the rotating one of the rings, and the microswitch array being adapted to generate a signal that is to be compared with another signal to sense at least one of the factors comprising the speed, acceleration, driving forces and braking forces on the one ring with reference to the other ring.

2. The antifriction bearing with sensors of claim 1, further comprising comparison means with which the signal from the microswitch array on the rotating part of the bearing is compared for sensing at least one of the factors.

3. The antifriction bearing with sensors of claim 2, wherein the comparison means comprises means of storing a basic pattern signal.

4. The antifriction bearing of claim 1, further comprising a second microsensor attached to the stationary one of the bearing rings and generating a comparison signal and means for comparing the signals of the first sensor with the signals of the second sensor for determining at least one of the factors.

5. The antifriction bearing of claim 1, wherein the microsensor comprises a microsize array of moveable bending bars arranged in an array of bending bars in a system, the bars being oriented and adapted to move laterally under the influence of force, and
   respective stops positioned for being contacted by each of the bending bars upon the application of certain forces to the bars, the stops being connected for generating a signal when contacted by the respective bar for producing the signal of the microsensor.

6. The bearing of claim 4, wherein the laterally movable bending bars are each respectively differently mounted, shaped and oriented as to provide responses at different levels of force applied to the bearing.

7. The bearing of claim 6, wherein the bending bars each have respective characteristics selected from the group consisting of different properties of the bar for bending to different extents, different operating points where the extent of bending causes the sensor to sense, varying differences between the stops for the bending bars for causing sensing at different force levels including varying dimensions of the bending bars including the length of bars.

8. The bearing of claim 1, wherein the microsensor is arranged on a chip which is fixed with respect to the respective ring.

9. The antifriction bearing of claim 1, wherein the microswitch array has variable characteristics that are selected from the group consisting of different switching times, different sensitivities, different resonant frequencies and different damping systems.

10. The antifriction bearing of claim 1, wherein energy supplied to the microswitch array at the moving ring of the bearing is by means of telemetry.

11. The antifriction bearing of claim 1, wherein energy supplied to the microswitch array on the moving ring of the bearing is by means of inductive coupling.

12. The antifriction bearing of claim 11, wherein the inductive coupling comprises coils in the moving ring which comprise electroplated and microstructured planar coils.

13. The antifriction bearing of claim 1, wherein the signal transmission from the rotating microswitch array is by means of telemetry.

14. The antifriction bearing of claim 1, wherein the signal transmission from the rotating microswitch array is by means of inductive coupling.

15. The antifriction bearing of claim 3, wherein energy supplied to and signal transmission from the comparison means at the stationary ring of the bearing is accomplished by telemetry.

16. The antifriction bearing of claim 3, wherein energy supplied to and signal transmission from the stationary ring of the bearing is accomplished by cable transmission thereto.

17. The antifriction bearing of claim 5, wherein the microsensor array comprises up to about 50 individual bars.

18. The antifriction bearing of claim 1, further comprising a chip supporting two of the microsensor arrays on the moving one of the rings, one of the arrays being arranged parallel to and the other array being arranged perpendicular to the radially acting centrifugal force on the rotating microsensor.

19. The antifriction bearing of claim 8, wherein the microsensor comprises a microsize array of moveable bending bars arranged in an array of bending bars in a system arranged on the chip, the bars being oriented and adapted to move laterally under the influence of force, and
   respective stops positioned for being contacted by each of the bending bars upon the application of certain forces to the bars, the stops being connected for generating a signal when contacted by the respective bar for producing the signal of the microsensor.

20. A method of sensing for recording the rotational speed or acceleration of wheels and driving and braking forces of a vehicle, wherein the vehicle has a plurality of wheels, and has a respective antifriction bearing at each of the wheels, with one ring of the bearing being connected with the wheel for rotating therewith and the other ring of the bearing being connected with the vehicle;
   a respective sensor for recording the rotational speed, acceleration of the wheel and driving and braking forces on the wheel, wherein each of the sensors is designed as a microsensor in the form of a microswitch array attached to the moving ring of the bearing and generating a signal upon rotation of the wheel;

the method ring comprising comparing the generated signal with another signal for determining the speed, acceleration, driving and braking forces on the wheel, and evaluating the signals of all of the sensors on all of the wheels for determining the factors of speed, acceleration, driving and braking forces on the vehicle.

21. The method of claim 20, wherein the microsensor comprises a microsize array of moveable bending bars arranged in an array of bending bars in a system, the bars being oriented and adapted to move laterally under the influence of force, and respective stops positioned for being contacted by each of the bending bars upon the application of certain forces to the bars, the stops being connected for generating a signal when contacted by the respective bar for producing the signal of the microsensor; the method comprising modifying the switching patterns of the bending bars as a digital word which is evaluated.

22. The method of claim 20, comprising comparing the rotational speed of the wheels, the lateral forces on the rotating and stationary part of each bearing, the tangential force or angular acceleration on the rotating system, the lateral forces and indirectly, by comparing the lateral acceleration with the angular acceleration, the slip being recorded for evaluating the travelling status.

* * * * *